No. 872,324. PATENTED DEC. 3, 1907.
S. R. BERGMAN.
MAGNETIC WEDGE.
APPLICATION FILED APR. 10, 1907.

Witnesses:
George H. Tilden.
J. Ellis Glenn.

Inventor:
Sven R. Bergman,
by Albert G. Davis
Att'y.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

MAGNETIC WEDGE.

No. 872,324.   Specification of Letters Patent.   Patented Dec. 3, 1907.

Application filed April 10, 1907. Serial No. 367,323.

*To all whom it may concern:*

Be it known that I, SVEN R. BERGMAN, a subject of the King of Sweden, residing at Lynn, county of Essex, State of Massachusetts, have invented certain new and useful Improvements in Magnetic Wedges, of which the following is a specification.

My invention relates to dynamo-electric machines and particularly to wedge devices for retaining conductors in slots formed in the core structures; and it has for its object to improve such devices.

In induction motors, for example, it is advantageous to have a substantially unbroken surface of magnetic material adjacent the air gap between the stator and rotor, in order to produce a uniform distribution of the flux and decrease the reluctance of the air gap. It is therefore desirable that the retaining devices for the coils be made of magnetic material; and, in order to prevent losses due to eddy currents in the retaining devices, the magnetic material should be finely divided.

I have found that a bundle of iron or steel wires suitably insulated from each other makes a very satisfactory retaining wedge. Such a wedge may be produced by rolling up a strip of iron or steel cloth until a desired mass is obtained and then forcing the mass into the proper form to fit the slots within which the conductors lie. The cloth is preferably annealed and then japanned before it is rolled up, whereby the successive layers are thoroughly insulated from each other without, however, producing any considerable gap between the portions of magnetic material. When the wedges are put in place they are insulated from the core structure by a thin layer of insulating material such as varnished paper, in order to prevent short-circuiting the laminæ.

Figure 1:
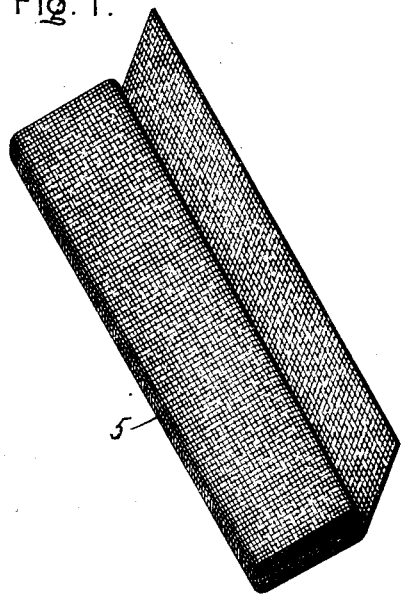
Figure 2:
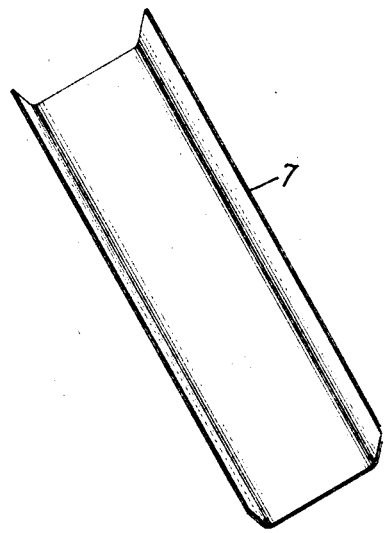
Figure 3:
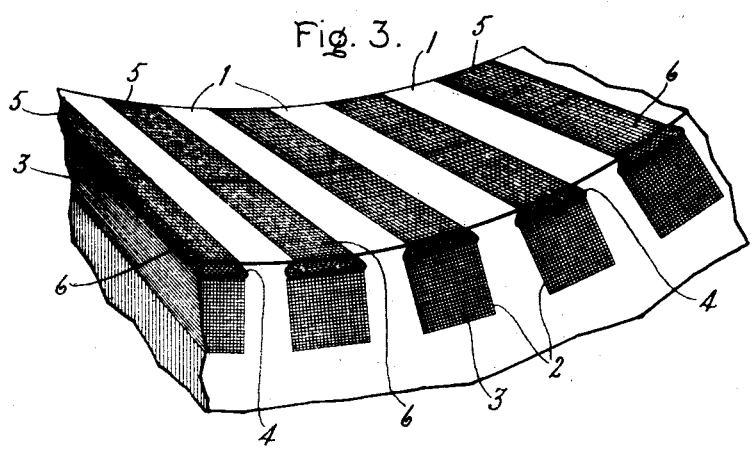

The various features of novelty which characterize my invention will be hereinafter particularly pointed out in the claims; but for a full understanding of the invention and of its various objects and advantages, reference may be had to the following detailed description taken in connection with the accompanying drawing, wherein:

Figure 1 shows, in process of construction, a magnetic wedge constituting a preferred form of the present invention; Fig. 2 is a perspective view of the insulation which separates the wedge from the core proper when the wedge is placed in position in a machine; and Fig. 3 is a perspective view of a fragment of a stator core of an induction motor having the coils held in place by means of my improved wedges.

Referring to the drawing, 1 indicates a stator core structure having slots 2 which contain coils or conductors 3. The conductors do not extend quite to the top of the slots, and at points just above the conductors the walls of the slots are under-cut slightly, as at 4.

5 and 6 are wedges, each of which is preferably one-half as long as the width of the core, and of a width and thickness such that when they are driven into the slots above the coils, they completely fill the slots and the under-cut portions and have their outer surfaces flush with the face of the core. Each of the wedges consists of a bundle of annealed iron or steel wires securely held together, the whole being surrounded on three sides by a strip of insulating material 7, formed of varnished paper or the like. The insulation prevents the wedge from short-circuiting the core. I have found that the magnetic portion of the wedge may be conveniently constructed when the wires are in the form of iron or steel cloth, the cloth being first japanned and then rolled or wound up upon a mandrel. The mandrel is then removed and the tube which remains is placed in a steel mold and forced into a compact mass. The japan thoroughly insulates the layers of cloth from each other without interposing any considerable gap in the magnetic path. After the wedge has been forced into shape, the covering of insulation is secured thereto in any suitable way, as, for example, by means of shellac.

While I have illustrated and described in detail only a single form of my invention, I do not desire to be limited to this particular form, but intend to cover any form of magnetic wedge made up of iron wire held together either mechanically, due to forming the wire into cloth, or in any other manner.

What I claim as new and desire to secure by Letters Patent of the United States, is—

1. As an article of manufacture, a slot-closing device consisting of a bundle of wires fastened together and insulated from each other.

2. As an article of manufacture, a slot closing device consisting of a roll of magnetic cloth having insulating material between the convolutions.

3. As an article of manufacture, a slot-closing device consisting of a roll of japanned magnetic cloth.

4. As an article of manufacture, a slot-closing device comprising in combination a bundle of wires fastened together and insulated from each other and a strip of insulating material partially surrounding the said bundle.

5. As an article of manufacture, a slot-closing device comprising in combination a roll of magnetic cloth having insulating material between the convolutions, and a strip of insulating material partially surrounding the said device.

6. As an article of manufacture, a slot-closing device comprising in combination a roll of japanned magnetic cloth, and a strip of insulating material partially surrounding the said roll.

7. In a dynamo-electric machine, a core having coil-receiving slots, and slot-closing devices in the form of bundles of insulated wire.

8. In a dynamo-electric machine, a core having coil-receiving slots and slot-closing devices comprising in combination bundles of wires fastened together and insulated from each other, and strips of insulating material partially surrounding said bundles.

9. In a dynamo-electric machine, a core having coil-receiving slots and slot-closing devices in the form of rolls of magnetic cloth.

10. In a dynamo-electric machine, a core having coil-receiving slots and slot-closing devices comprising in combination rolls of magnetic cloth, and strips of insulating material partially surrounding said rolls.

In witness whereof, I have hereunto set my hand this sixth day of April, 1907.

SVEN R. BERGMAN.

Witnesses:
JOHN A. McMANUS, Jr.,
PHILIP F. HARRINGTON.